Figure 1:
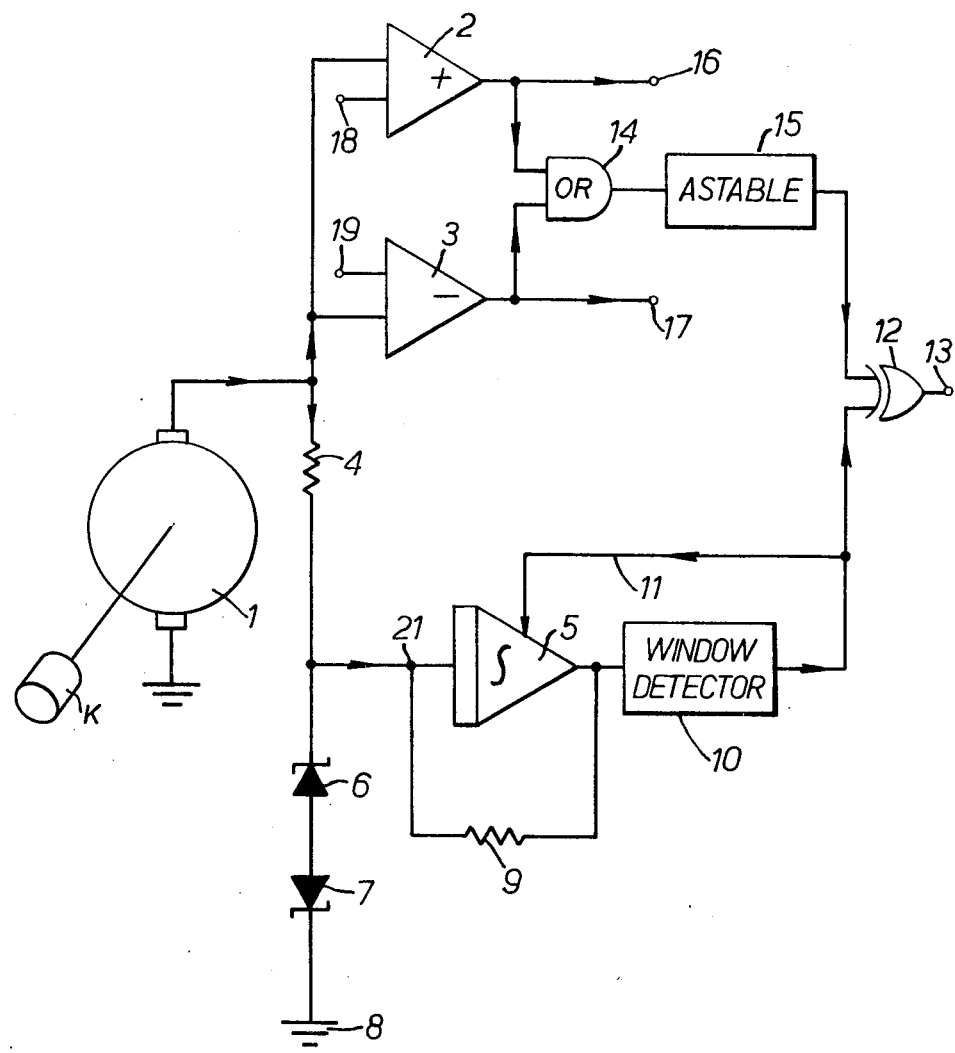

United States Patent [19]

Clarke

[11] 4,144,481

[45] Mar. 13, 1979

[54] CONTROL DEVICES

[75] Inventor: Graham J. Clarke, St. Albans, England

[73] Assignee: Marconi Instruments Limited, Chelmsford, England

[21] Appl. No.: 778,257

[22] Filed: Mar. 16, 1977

[30] Foreign Application Priority Data

Mar. 18, 1976 [GB] United Kingdom ............... 10888/76

[51] Int. Cl.$^2$ ............................................. H02P 5/16
[52] U.S. Cl. .............................. 318/331; 318/345 AB; 318/457
[58] Field of Search ........ 318/331, 317, 347, 345 AB, 318/345 CA, 343, 457

[56] References Cited

U.S. PATENT DOCUMENTS

| 3,488,756 | 1/1970 | Skrivanek, Jr. | 318/331 |
| 3,508,134 | 4/1970 | Dosch et al. | 318/331 |

Primary Examiner—Herman J. Hohauser
Attorney, Agent, or Firm—Diller, Ramik & Wight

[57] ABSTRACT

A control device for electronic apparatus is provided with a d.c. ironless motor coupled to a manually rotatable knob. As the knob is rotated a digital signal representative of the rotation is derived from the back e.m.f. of the motor.

14 Claims, 3 Drawing Figures

CONTROL DEVICES

This invention relates to control devices of the kind intended for use with electronic or electrical apparatus.

According to this invention, a control device suitable for an electronic apparatus includes a rotatable driving member coupled to a d.c. ironless motor, and means for deriving a control signal from the back e.m.f. generated by the motor when the rotatable member is driven.

According to a further aspect of this invention, a control device suitable for an electronic apparatus includes a rotatable member coupled to a d.c. ironless motor, means for deriving from the back e.m.f. generated by the motor when the rotatable member is rotated a sequence of digital pulses representative of said rotation, and an electrical signal indicative of the sense of rotation. Preferably, the rotatable member is a manually rotatable knob.

Although the sequence of digital pulses may be directly proportional to the rate of said rotation, nevertheless for practical reasons this is not always desirable and preferably the sequence of digital pulses is related non-linearly to the rate of rotation of the rotatable member or knob such that above a certain rate of rotation the frequency of the digital pulses becomes constant, and below a certain rate of rotation the frequency of the digital pulses becomes constant. Preferably again, no digital pulses are generated when the knob is stationary.

The use of a d.c. ironless motor provides a control device with a very good feel to it, and one which is subjectively very pleasant to use. The feel of a control knob can be very important to a user, and in the past, quality control devices have been very expensive to produce. Additionally, the control device in accordance with this invention has only a very low current consumption, is capable of providing a precise control signal tailored to particular requirements which hitherto have often required large and complex mechanical arrangements, and which, therefore, have also been heavy and expensive.

The d.c. ironless motor is, in a preferred embodiment, arranged to feed a pair of high gain amplifiers which produce signals representative of the direction of rotation of the control knob, and also to feed a variable rate pulse generator which, over a selected range of rotational speeds, produces pulses at a frequency which is proportional to rotational speed.

Figure 2:
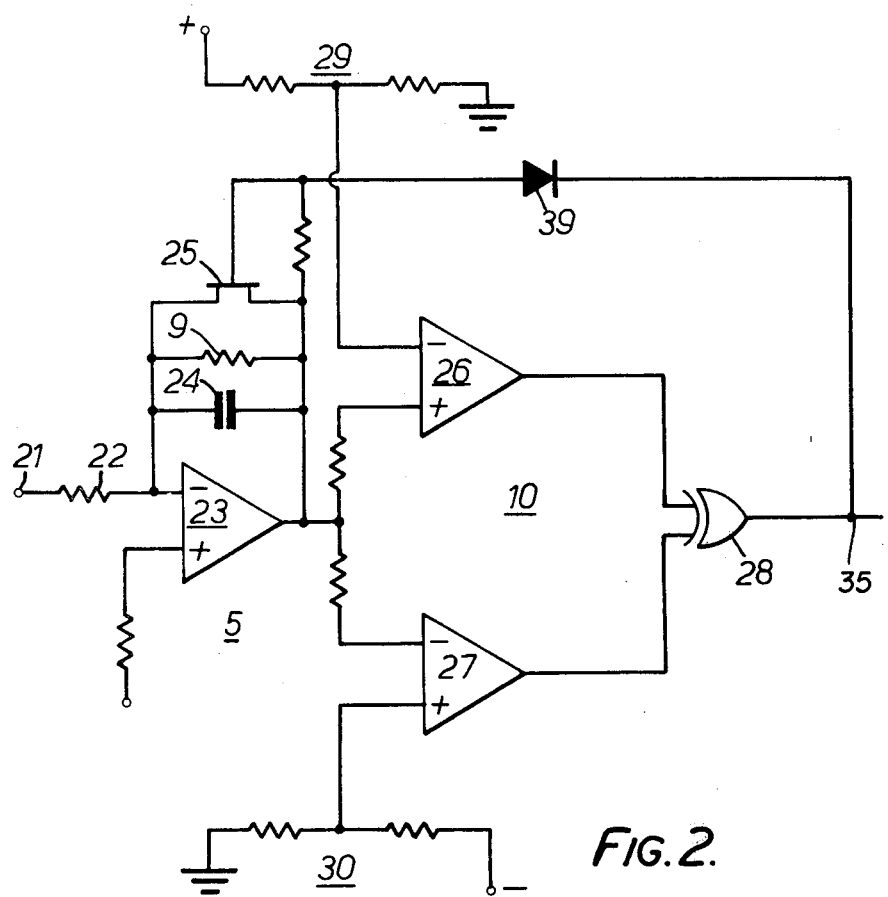
Figure 3:
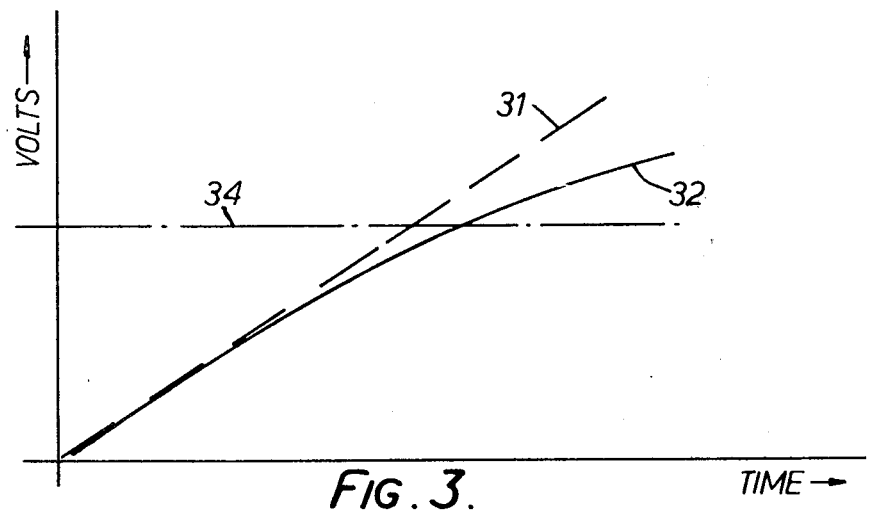

The invention is further described, by way of example, with reference to the accompanying drawings in which FIG. 1 shows diagrammatically a control device in accordance with the present invention, FIG. 2 shows a part of the control device in greater detail, and FIG. 3 is an explanatory diagram.

Referring to FIG. 1, a d.c. ironless motor 1 is connected to two high gain differential amplifiers 2, 3, and also, via a resistor 4, to an integrator circuit 5. The inputs 18, 19 of the differential comparators which are not shown in greater detail, are connected to suitable voltage reference levels in conventional manner. The input to the integrator circuit 5 is also connected to a reference potential 8 (shown as earth) via a pair of Zener diodes 6, 7 arranged to limit the voltage excursions at the input to the integrator circuit 5. The integrator circuit 5 is provided with a feedback path represented by resistor 9, and is arranged to feed a window detector 10, the output of which is used to reset the integrator circuit 5 via a reset line 11. The integrator circuit 5 and the window detector 10 are more fully described later with reference to FIG. 2. The output of the window detector 10 is also fed via an exclusive-OR gate 12 to an output terminal 13. The outputs of the high gain amplifiers 2, 3, are fed via a further OR gate 14 to an astable circuit 15, which is also connected via the exclusive-OR gate 12 to the output terminal 13. The outputs of the amplifiers 2, 3 are also directly connected to output terminals 16, 17 respectively.

The d.c. ironless motor 1 is mechanically coupled to a rotatable knob k which is intended to be turned manually by an operator when using an electronic apparatus incorporating the control device. For example, the knob and the motor can be mounted directly on the same shaft. Motors of this kind turn very smoothly and evenly, and do not have the notchy feel associated with d.c. motors having ferromagnetic stators. Suitable d.c. ironless motors are readily available, one such motor is the Philips type 9904 – 120 – 12601.

The operation of the control device is as follows. When the knob is manually turned the motor 1 rotates, thereby generating a small back e.m.f. which, depending on its polarity, is amplified by one or other of the high gain differential amplifiers 2 or 3. In practice each amplifier could be provided with a pair of differential inputs, one input of each being connected to a different reference potential. Amplifier 2 has a high positive gain, whilst amplifier 3 is an inverting amplifier of similar gain so that terminal 16 provides an output signal for positive back e.m.f.'s, and terminal 17 provides an output signal for negative e.m.f.'s. Thus, terminals 16 and 17 provide signals indicative of whether the knob is being turned clockwise or anticlockwise.

The back e.m.f. of motor 1, is also passed to the integrator 5, and hence to the window detector 10, these being illustrated in greater detail in FIG. 2. Referring to FIG. 2, the back e.m.f. is applied via terminal 21 and resistor 22 to the integrator 5 which consists basically of a high gain amplifier 23, the resistor 9 and a capacitor 24, plus a transistor 25 for discharging the capacitor. The presence of the back e.m.f. at the input of amplifier 23 generates a rising ramp voltage, the gradient of which is controlled by the capacitor 24 and the resistor 22 and is proportional to the back e.m.f., the resistor 9 having a relatively high value so that the capacitor discharges slowly, giving the effect of a leaky integrator. The effect of this is shown in FIG. 3, in which the theoretical gradient of the ramp voltage 31 dictated by the value of capacitor 24 is modified to the profile 32 by the effect of the leakage resistor 9.

The ramp voltage is applied to the window detector 10, which consists essentially of two differential high gain amplifiers 26, 27 coupled to an exclusive-OR gate 28. The inverting input of amplifier 26 is connected to a potential divider 29 coupled between a positive potential and earth, and the non-inverting input of amplifier 27 is connected to a potential divider 30 coupled between earth and a negative potential. Depending on the polarity of the ramp voltage produced by integrator 10, one or other of the amplifiers 26, 27, produces an output signal when the level of the ramp reaches the threshold level set by potential dividers 29 and 30. This threshold level is shown by 2 line 34 61 in FIG. 3. When the threshold is exceeded, an output signal is passed by exclusive-OR gate 28 to terminal 35 (which is connected to exclusive-OR gate 12 of FIG. 1) and a reset signal is passed via diode 39 to turn on transistor 25, thereby discharging capacitor 24 rapidly. Transistor 25 is a field effect transistor and does not affect the ramp profile when turned off. It will be seen that the output signal passed via exclusive-OR gate 12 is, therefore, a pulse of short duration, and the frequency of the pulses so generated depends on the amplitude of the back e.m.f. produced by the motor 1.

If the back e.m.f. is low, the ramp voltage rises very slowly, producing slow rate output pulses. never, in The value of the resistor 9 is chosen such that for an e.m.f. below a predetermined value, the ramp voltage never, in fact, reaches the threshold levels set by the potential dividers 29 and 30.

However, even when the back e.m.f. generated by motor 1 is very low indeed, the high gain amplifiers 2 and 3, which have already been described in relation to the generation of signals representative of the sense of rotation, generate signals, which via OR gate 14, enable a free running astable 15, which has a very low switching frequency, typically about 2Hz. Thus, even very slow rotation of the knob produces output pulses at terminal 13, although at a very low frequency. This gives the feel of fine resolution.

When the knob is stationary, no pulses are produced, and in practice a small threshold level could be introduced into amplifiers 2 and 3, so that for small involuntary finger movements no output pulses are produced.

The Zener diodes 6 and 7, are provided to limit the amplitude of the large back e.m.f. produced when the knob is spun very rapidly. This can be used to tailor the maximum output pulse rate to suit the equipment being controlled.

The control device is of general application when it is desired to produce a control signal in response to rotational movement, and the subjective impression given to an operator using the knob is that the feel is comparable to, or better than, very expensive mechanical/optical arrangements. If desired, the control device can be arranged to simulate an inertial flywheel effect sometimes incorporated in expensive mechanical control devices, and such a control device is referred to in our copending patent application Ser. No. 778,256, filed Mar. 16, 1977.

I claim:

1. A control device suitable for controlling an electronic apparatus and adapted to produce an output signal in response to rotation of a control member comprising in combination:
    a d.c. ironless motor having a rotatable member connected with a control member and which generates back e.m.f. when rotated by the control member; and
    signal generating means connected to said motor for generating said output signal in response to the generated back e.m.f.

2. A control device suitable for an electronic apparatus including a rotatable member coupled to a d.c. ironless motor, means for deriving from the back e.m.f. generated by the motor when the rotatable member is rotated a sequence of digital pulses representative of said rotation, and an electrical signal indicative of the sense of rotation.

3. A control device as claimed in claim 1 and wherein the control member is a manually rotatable knob.

4. A control device as claimed in claim 2 and wherein the sequence of digital pulses is related non-linearly to the rate of rotation of the rotatable member or knob such that above a certain rate of rotation the frequency of the digital pulses becomes constant, and below a certain rate of rotation the frequency of the digital pulses becomes constant.

5. A control device as claimed in claim 4 and wherein no digital pulses are generated when the knob is stationary.

6. A control device as claimed in claim 2 and wherein the d.c. ironless motor is arranged to feed a pair of high gain amplifiers which produce signals representative of the direction of rotation of the rotatable member, and also to feed a variable rate pulse generator which, over a selected range of rotational speeds, produces pulses at a frequency which is proportional to rotational speed.

7. A device adapted to produce a train of output pulses in response to rotation of a control member, comprising in combination:
    a d.c. ironless motor having a rotatable member connected with a control member and which generates back e.m.f. when rotated by the control member; and
    pulse generating means connected to said motor for generating said train of output pulses in response to the generated back e.m.f.

8. A device as defined in claim 7 wherein said pulse generating means comprises a free running astable device having a fixed output frequency and means for enabling said astable device in response to the generated back e.m.f.

9. A device as defined in claim 7 wherein said pulse generating means comprises a differential amplifier having an inverting input terminal connected to receive the generated back e.m.f. and having an output terminal, a capacitor connected across said inverting input terminal and said output terminal, normally open switch means connected across said capacitor, a second differential amplifier having one input terminal connected to the output terminal of the first mentioned differential amplifier and having an output terminal, and gate means connected to the output terminal of said second amplifier for producing an output pulse when said capacitor has charged to a predetermined level, said switch means being actuated by the output of said gate means for discharging said capacitor.

10. A device as defined in claim 9 including a resistor connected across said capacitor for preventing the charge on said capacitor from reaching said predetermined level when the generated back e.m.f. is less than a selected value.

11. A device as defined in claim 10 wherein said pulse generating means comprises a free running astable device having a fixed output frequency and means for enabling said astable device in response to the generated back e.m.f.

12. A control device suitable for controlling an external electronic apparatus in response to manual control input thereto, comprising in combination:
    a d.c. ironless motor having a rotatable member which is normally stationary and which generates back e.m.f. when rotated;
    means for manually rotating said rotatable member whereby manual input to said device is translated into generated back e.m.f.; and
    signal generating means connected to said motor for generating an output signal in response to the generated back e.m.f. to control the external electronic apparatus.

13. A mechanical input device for generating an electrical control signal which controls an external electronic apparatus, comprising in combination:
- a d.c. ironless motor having a rotatable member which generates back e.m.f. when rotated;
- manual input means connected to said rotatable member for controlling rotation of said rotatable member whereby the rotational speed of said rotatable member, and therefore the generated back e.m.f., is manually controlled; and
- signal generating means for producing said electrical control signal in response to generated back e.m.f.

14. A device for generating an electrical control signal which is employed to control an electronic apparatus, comprising in combination:
- manual input means for generating back e.m.f. in response to manual input, said manual input means comprising a d.c. ironless motor having a rotatable member which generates back e.m.f. in response to rotation thereof, and manual control means connected to said rotatable member for controlling the rotation thereof; and
- signal generating means for generating said electrical control signal in response to said generated back e.m.f., whereby said control signal is a function of said manual input means.

* * * * *